United States Patent [19]
Linder et al.

[11] Patent Number: 5,345,897
[45] Date of Patent: Sep. 13, 1994

[54] GAS-EXCHANGING PROCESS FOR TWO-STROKE, INTERNAL COMBUSTION ENGINES

[75] Inventors: Ernst Linder; Hans Schlembach, both of Muehlacker, Fed. Rep. of Germany

[73] Assignee: Robert Bosch GmbH, Stuttgart, Fed. Rep. of Germany

[21] Appl. No.: 71,822

[22] Filed: Jun. 7, 1993

[30] Foreign Application Priority Data

Jul. 31, 1992 [DE] Fed. Rep. of Germany ....... 4225369

[51] Int. Cl.$^5$ .............................................. F02B 75/02
[52] U.S. Cl. ............................ 123/65 A; 123/65 VB; 123/73 CA; 123/73 AF
[58] Field of Search ................ 123/65 A, 73 C, 65 V, 123/65 VB, 297, 73 BA, 73 CA, 73 AB, 73 AF, 73 S, 65 B, 65 BA

[56] References Cited
U.S. PATENT DOCUMENTS

| | | | |
|---|---|---|---|
| 2,285,671 | 6/1942 | Mallory | 123/65 VB |
| 4,202,297 | 5/1980 | Oku et al. | 123/65 V |
| 5,005,537 | 4/1991 | Maissant | 123/73 BA |

FOREIGN PATENT DOCUMENTS

886818  10/1943  France .................... 123/73 AB

OTHER PUBLICATIONS

SAE—Paper 9008001 1990 Peugeot (2 pages).

*Primary Examiner*—Noah P. Kamen
*Attorney, Agent, or Firm*—Edwin E. Greigg; Ronald E. Geigg

[57] ABSTRACT

The invention relates to a gas-exchanging process for two-stroke internal combustion engines, and a two-stroke internal combustion engine for executing the process, in which two scavenging paths of the gas are provided, namely the known reverse scavenging as the first scavenging path, and a second supply of combustion air effected by precompression serving as the second scavenging path, wherein during the second scavenging an ignitable fuel-air mixture forms in the area of the point of ignition and, by means of the differential pressure established at the intake valve, controls the mixture as well as the quantity itself.

25 Claims, 3 Drawing Sheets

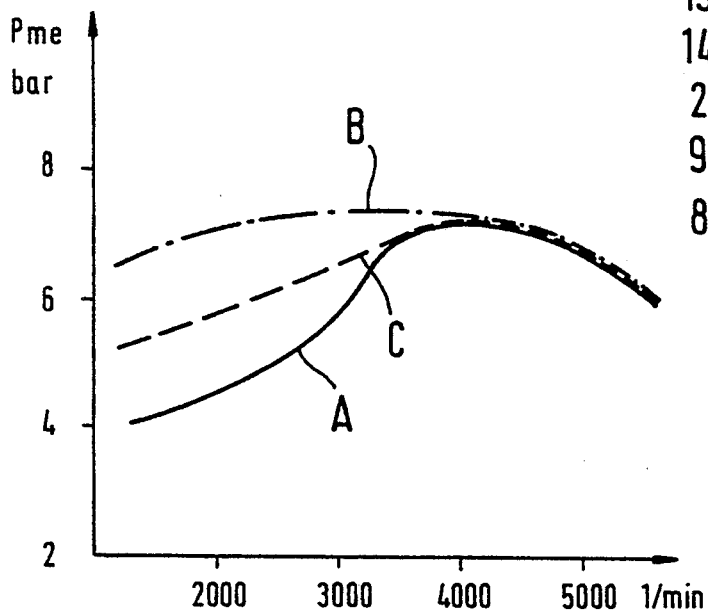
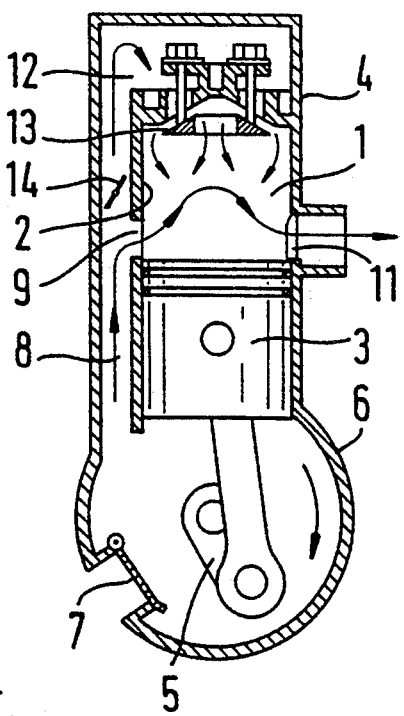
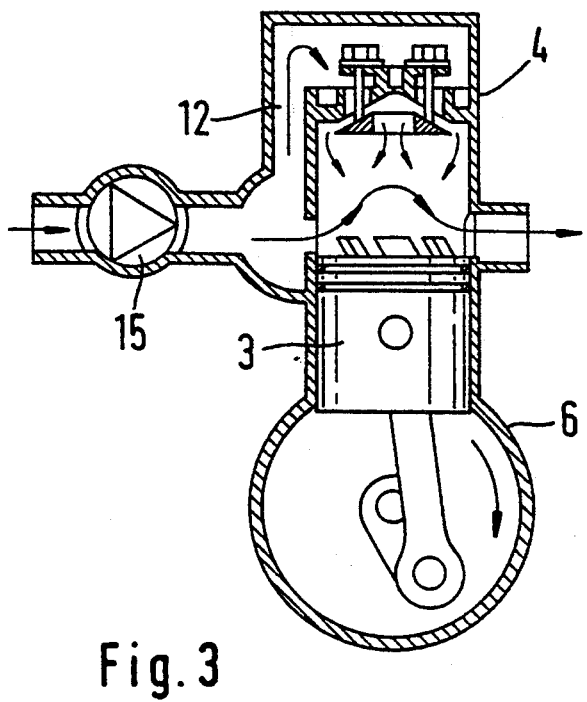
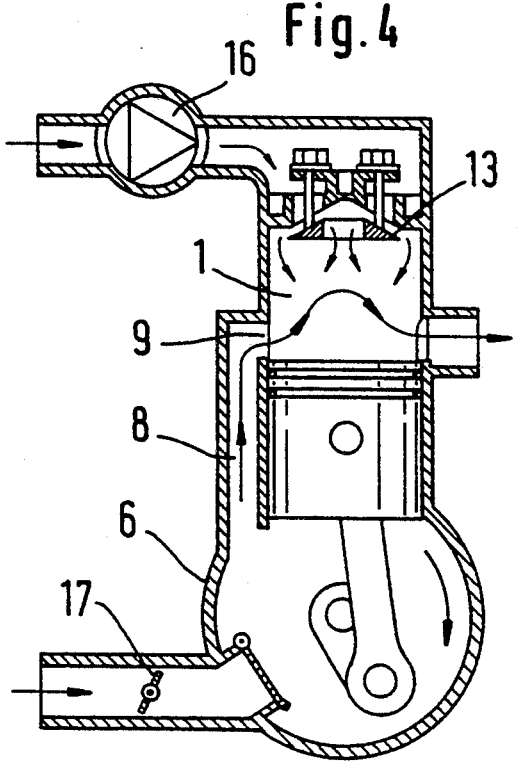

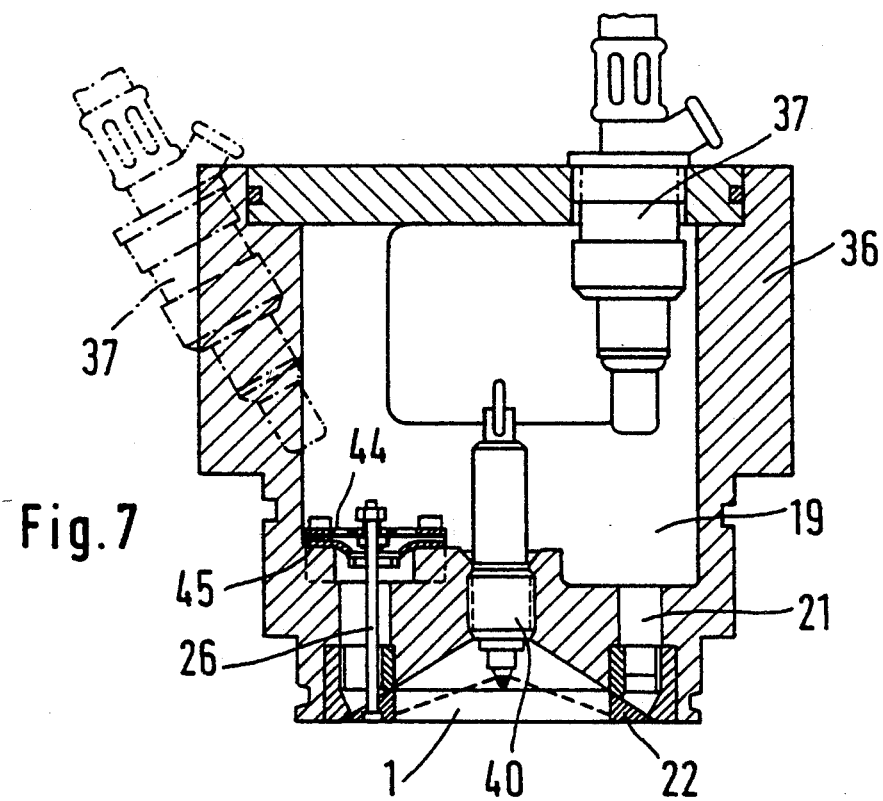
Fig. 7
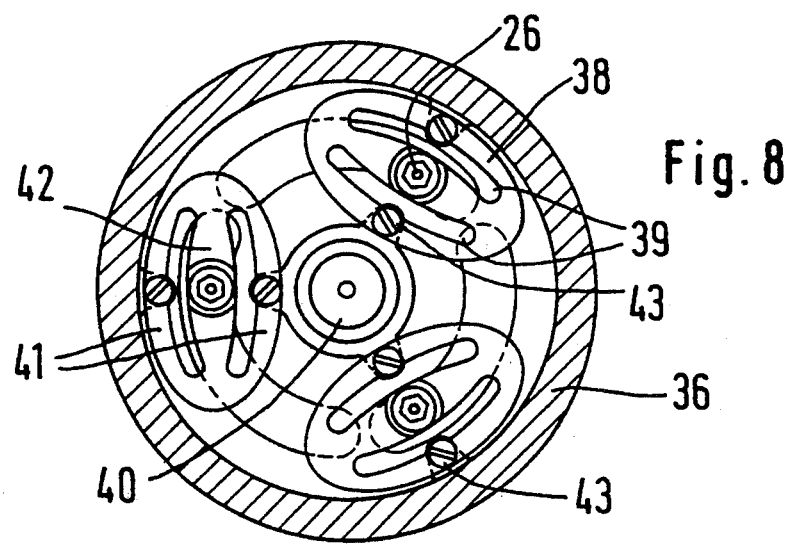
Fig. 8
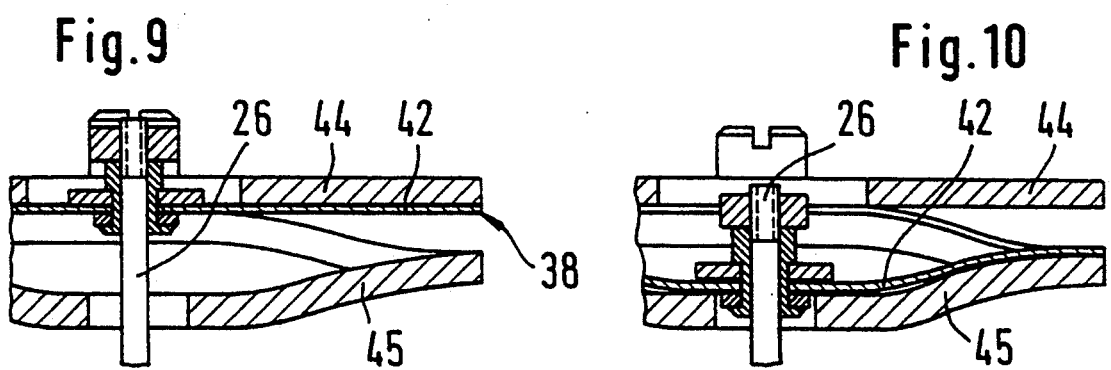
Fig. 9
Fig. 10

GAS-EXCHANGING PROCESS FOR TWO-STROKE, INTERNAL COMBUSTION ENGINES

BACKGROUND OF THE INVENTION

The invention is based on a gas-exchanging process for two-stroke internal combustion engines as defined hereinafter, and to a two-stroke internal combustion engine for executing this process.

It is known that the disadvantages of the gas-exchanging process when used with two-stroke internal combustion engines, whether with externally provided ignition or self-ignited, stem above all from the gas-exchanging process, wherein on the one hand a mixture that is both ignitable and combustible is to be present at the point of ignition at the time of ignition and, on the other hand, the proportion of waste gases remaining in the combustion chamber should be as small as possible during the scavenging process. Thus, it is known that 15-25 percent of the piston stroke cannot be used to perform useful work, because only the filling volume can be converted into work. For this reason the type of scavenging plays a decisive role, as do the supply and precompression of the combustion air before it is supplied to the combustion chamber by means of inlet ports valves. A poor scavenging process and disadvantageous mixture formation in the area of the point of ignition lead to misfiring, poor running, high hydrocarbon emissions and disadvantageous fuel consumption.

The most commonly used type of scavenging in two-stroke internal combustion engines is reverse scavenging. Although in this case the advantages of simple engine design and low production costs are in effect, it is especially difficult to obtain optimum scavenging ratios in the total rpm range, because the oscillating behavior of the waste gas system results directly from the port opening control present. Normally, the waste gas system is optimized in such a way that the advantageous scavenging ratios are present at high rpm. In the process the inlet ports are only opened relatively late after outlet ports, so that the low pressure wave has already ebbed, and the pressure wave reflected in the waste gas system arrives again at the outlet port before the port is closed. By means of this, extremely poor filling ratios result, with respect to combustion air and fuel to waste gas on the one hand and, on the other hand, a high residual content of waste gas results in the combustion chamber, which leads to poor operating characteristics. Although improved scavenging and filling ratios can be obtained by means of an additional, external supercharger and correspondingly high precompression of the combustion air, or by means of controlling engagement of the waste gas stream; however, the fundamental problem of reverse scavenging cannot be rectified. In contrast, head-scavenged two-stroke engines have the advantage that, by means of well-timed control of the intake and outlet valves, particularly in the area of the point of ignition inside the combustion chamber, very good scavenging is accomplished. However, the disadvantages of this are that, during the gas exchanges typical for two-stroke engines, correspondingly large control cross-sections of the valves (4-valve or multivalve systems) must be available to a valve control for good filling, or that a powerful charger (compressor) is required for the combustion air. Both the valve drive and the charger are labor- and cost-intensive. In addition, the power loss in head-scavenged, two-stroke engines is relatively high in comparison to reverse-scavenged two-stroke engines, which negatively affects fuel consumption, and $NO_x$ emissions in particular. Because of the short gas exchanges necessary, the valve drive must additionally operate with double frequency in comparison to the four-stroke engine, causing considerable problems for controlling the inertial forces and thus limiting the maximum rpm of the engine to a comparatively low value.

With a known gas-exchanging process (Peugeot, SAE-Paper 9008001 1990) of the generic type of the present invention, a relatively small quantity of combustion air is supplied in addition to the port-controlled reverse scavenging, via an intake valve in the cylinder head; this quantity of air does not serve in scavenging the quantities of gas present in the combustion chamber, but rather to process and transport the fuel supplied on the aspiration side. For this reason this quantity of compression air amounts at most to 10% of the cylinder filling. The crankcase as a pump acts in a way known per se as a compressor for the combustion air. The ineffective spaces resulting from the additional air conduits correspondingly reduce the degree of pumping effectiveness, leading to a worsening of the precompression of the combustion air, and hence to the aforementioned disadvantages.

With another known process of the generic type of the present invention a separate pump for compression air having a pressure level of 5-7 bar is used for the precompression of this separate compression air used for fuel transport or in the processing of the fuel/air quantity.

In both known processes, fuel injection must be interrupted when the pressure in the combustion chamber becomes higher than the pressure in the aspirating tube, in order to prevent the fuel-air mixture from being forced back. During this period of time between the blocking of the intake valve and the time of ignition, and particularly at a low charge, the fuel in the combustion chamber can mix with the charge supplied via the input port and output port and is greatly diluted, which is undesirable and can lead to problems during ignition. Moreover, the aforementioned disadvantages of the reverse scavenging process and the head-scavenging process remain, without an actual improvement in scavenging. With both processes, it is attempted to combine an injection on the aspiration side in the area of the cylinder head with a reverse scavenging process for a two-stroke engine.

OBJECT AND SUMMARY OF THE INVENTION

In contrast, the advantage of the gas-exchanging process in accordance with the invention or the two-stroke internal combustion engine is that the advantages of the reverse scavenging are combined with those of head scavenging, and a significantly larger quantity of combustion air, namely up to 40% of the cylinder filling, is conducted via the cylinder head and the sole differential-pressure-controlled intake valve into the combustion chamber than with the known process. By means of the invention, large quantities of air are supplied with relatively low overpressure, which is technically simpler and more cost-effective to achieve than the high pressures during precompression of the combustion air with the known process. The advantages are evident in an improved scavenging of the combustion chamber, fewer misfirings during ignition, fewer hydrocarbons, more economical consumption, greater torque, above all in the lower rpm range, a relatively small blower output, low mechanical losses and a relatively small mean pressure at the same torque, by means of which less $NO_x$ and thus better fuel consumption result. This two-way scavenging process can be employed not only in two-stroke engines with externally provided ignition, but also with self-ignition and, most significantly, operates without an elaborate control portion of the intake valve control. A crucial point is that these valves, which are controlled strictly dependent on differential pressure, are not limited by rpm, as opposed to camshaft-controlled valves.

In accordance with an advantageous embodiment of the invention, the combustion air of both scavenging paths is precompressed in the crankcase. The advantage is found mainly in the simple design, the low weight, ease of rotation with higher torque, low mechanical losses, low $NO_x$ and low tendency to misfire.

In accordance with another advantageous embodiment of the invention, the compression air of both scavenging paths is compressed by means of a supercharger. The mechanical losses, somewhat higher in this case, and the slightly higher $NO_x$ are offset by the advantages of a very high torque at great ease of rotation, and no further misfirings occur.

In both of these embodiments, the combustion air is channeled appropriately to the inlet control port or the intake valve, and an additional influence on quantity can be executed by means of appropriate intervention in the airstream.

In accordance with a further advantageous embodiment of the invention, the combustion air for the first scavenging path is compressed in the crankcase and in a separate charger for the second scavenging path. The two quantities of air can be controlled independently of each other to optimize the two-way scavenging process. The particular advantage of this combination of separate precompressors is that the mechanical losses can be reduced somewhat with greater ease of rotation of the engine and higher torque. In addition, the $NO_x$ can be significantly reduced by means of a separated combustion air control of this kind.

In accordance with a further advantageous embodiment of the invention, the output port can only be opened starting at 40 degrees above bottom dead center (BDC) of the crankshaft of the engine piston. By means of this, the torque is improved by the higher unburnt gas component in the lower rpm range. This, therefore, does not only apply when an additional charger is provided.

In accordance with a further advantageous embodiment of the invention, the waste gas stream can be throttled under control, by means of which the performance of the waste gas system is optimized, and has a direct influence on the mean pressure in the combustion chamber or the torque progression of the engine. The reflected pressure wave exiting the waste gas system can thus be controlled with respect to time as well as intensity.

In accordance with a further advantageous embodiment of the invention relating to two-stroke internal combustion engines, the movable valve element is embodied as a ring that controls a number of preferably annularly disposed inlet conduits for the second scavenging quantity and is coupled to the closing springs via a plurality of driving pins. An annular embodiment of the valve element permits a large throughput cross-section, particularly in comparison to plate valves; aside from the fact that an annular valve permits engagement surfaces on the ring desired here in a particularly advantageous manner for the control of differential pressure. In addition, the relatively large quantities of air streaming in have a positive cooling effect on the valve. Last but not least, relatively small strokes of such an annular valve are sufficient to expose large inlet cross-sections.

In accordance with a further advantageous embodiment of the invention, this intake valve functions as a double seat control valve, and the valve ring can be tapered toward the cylinder head and cooperate with a seat surface, which is correspondingly inwardly conical, disposed on the cylinder head, and in which the inlet conduits discharge. The valve ring can preferably have a triangular cross-section. As soon as the valve ring rises from its two seats, namely the inner and outer valve seat, two large throughput cross-sections are available for the second scavenged quantity. The triangular cross-section with its wedge shape results structurally in an advantageous combustion cavity in the cylinder head, so that with direct fuel injection, for example, the stream of fuel does not reach the cylinder wall, but the valve ring, from where it is removed by the combustion air streaming, on the one hand and, as the piston approaches top dead center, by an appropriate squish stream.

In accordance with a further advantageous embodiment of the invention, the valve seat is disposed on a valve ring seat cut into an annular groove of the cylinder head, in which case the valve ring seat can comprise two concentrically disposed seat rings, namely an inner seat ring and an outer seat ring, between which an annular chamber is provided for the flow of gas. In accordance with the invention, guide blades disposed on the inner seat ring and extending diagonally toward the annular chamber, can be provided for producing spinning of the airstream. By means of this spin, a high relative speed is attained between the supplied combustion air and the fuel deposited on the surface of the valve ring. In addition to this advantageous distribution of fuel in the combustion air, by means of this two-way scavenging process a stratified charge occurs, especially in the lower load area, with the known advantages with regard to consumption and waste gas; this ensures that sufficient oxygen is present in the area of ignition. The residual gas filling needed for lower $NO_x$ emissions is more concentrated in the engine piston area than in the cylinder head area, so that a positive stratification is also produced with respect to the proportion of residual gas.

In accordance with a further advantageous embodiment of the invention, the driving pins are guided in bores of the cylinder head, near the inlet conduits, and the closing spring is disposed inside the cylinder head, upstream of the inlet conduits. By means of this, the closing spring is not exposed to the combustion gases, and the driving pins can have as small a mass as possible because of the guidance.

In accordance with a further advantageous embodiment of the invention, a leaf spring system secured to the cylinder head on the side remote from the valve seat serves as the closing spring, wherein the leaf spring system can comprise at least three individual leaf springs that can consist of oval disks with longitudinal recesses. The driving pin is hinged on the center strip created by this, while the outer strips are fastened on the cylinder head. The advantage of this type of control valve is the ability to react quickly to the pressure difference ahead of and behind the inlet conduits—also because of the small mass of these valves—and, as mentioned above, a large opening cross-section is made possible during a small stroke.

In accordance with a further advantageous embodiment of the invention, the stroke of the leaf spring system is limited by stroke catchers; the stroke catcher changes the actual length of the leaf spring during the stroke movement of the intake valve as a function of the stroke by means of different stroke-dependent seating of the leaf spring on the stroke catcher. An upper and a lower stroke catcher in particular can be provided that are respectively embodied as rings; the upper stroke catcher, designated for the closing procedure, can be planar, while the lower stroke catcher functioning in the opening procedure can be correspondingly plate-shaped. The stroke catcher in accordance with the invention effects a damping during the stroke impact by means of a pneumatic squeezing stream (squish), and prevents uncontrolled bouncing and fluttering of the leaf springs when the valve impacts. The lower stroke catcher damps the impact by means of a progressive spring rate, in that the stroke catching contour differs from the bending line of the leaf spring such that the seating point of the leaf spring on the stroke catcher travels radially inwardly as impact nears, and the actual length of the leaf spring thus decreases; the same can apply to the upper stroke catcher. Because of this the closing or return force of the leaf spring engaging the movable valve element also changes as a function of its stroke, that is, the quantity of air flowing through. In the process the opening and closing motions are damped without disadvantages for high operating frequencies.

In accordance with a further exemplary embodiment of the invention, the two-stroke internal combustion engine operates with ignition provided externally by a spark plug at the point of ignition in the area of the combustion air inlet. The fuel can be supplied in accordance with the invention as a suction pipe injection, thus upstream of the intake valve, and is deliberately and purposefully distributed asymmetrically into the second scavenged quantity (combustion air) to avoid the collection of fuel in pockets of remaining gas.

In accordance with a further advantageous embodiment of the invention, the fuel is injected directly into the combustion chamber by means of an injection valve. In an engine with externally provided ignition, this injection is effected directly before the point of ignition, and this time period is sufficiently long that a stratified charge can be obtained, in particular between the second scavenging quantity and the fuel, before ignition occurs. It is vital that sufficient oxygen is present in the area of the spark plug. The most notable advantage is the low $NO_x$ emission. In any case, the injection cone and the ignition sparks must overlap.

In accordance with an advantageous embodiment of the invention with respect to this, the injection nozzle and the ignition device are embodied as one unit with an injection valve having at least one injection opening and electrically insulated with respect to a support tube with which it is installed in the engine, and having two ignition electrodes in the injection cone, near the injection opening. One electrode is disposed on the body of the injection valve and electrically connected with the engine via this valve body, and the other electrode is grounded via the support tube to the engine. A device of this type is known per se (German Patent Disclosure C 3731 211), but not for a two-stroke internal combustion engine with its special problems, as described above, with respect to misfirings and other disadvantages within specific, particularly low rpm ranges and non-optimized scavenging procedures. The danger that a non-ignitable mixture is present at the point of ignition is notably reduced. With the scavenging procedure described above for a two-stroke internal combustion engine, mixing of fuel with the charge that has not yet been scavenged can occur in the time frame between the supply of gas and ignition, particularly during a low load and at low rpm; this can lead to severe dilution and correspondingly poor ignition. By means of correctly timed injection at high pressure, this is avoided, and this type of process is simpler and less expensive than operating with a high compression pressure of the combustion air. In this way the two-way scavenging procedure of the invention is significantly improved and insured against the typical disadvantages of the two-stroke internal combustion engine with the aforementioned scavenging process.

In accordance with a further advantageous embodiment of the invention, a cross-sectional control device (adjustable throttle) is disposed in the flow conduit of the second scavenging quantity. Because of this the second scavenging quantity can be throttled in the range of crucial rpm or shut off at excessive rpm. The latter can also be achieved in accordance with the invention by means of a blockage of the butterfly valve against opening, for example by magnetic means.

The invention will be better understood and further objects and advantages thereof will become more apparent from the ensuing detailed description of preferred embodiments taken in conjunction with the drawings.

BRIEF DESCRIPTION OF THE DRAWINGS

A plurality of exemplary embodiments of the subject of the invention is represented in the drawings and described in more detail below. Shown are in:

FIG. 1 is an average-pressure diagram;

FIGS. 2, 3 and 4 is simplified representations of two-stroke internal combustion engines in three exemplary embodiments;

FIGS. 7 and 8 is representations corresponding to FIGS. 5 and 6 by means of a further exemplary embodiment; and FIGS. 9 and 10 is details from FIG. 7 on an enlarged scale regarding a stroke catcher.

DESCRIPTION OF THE PREFERRED EMBODIMENTS

Figure 5:
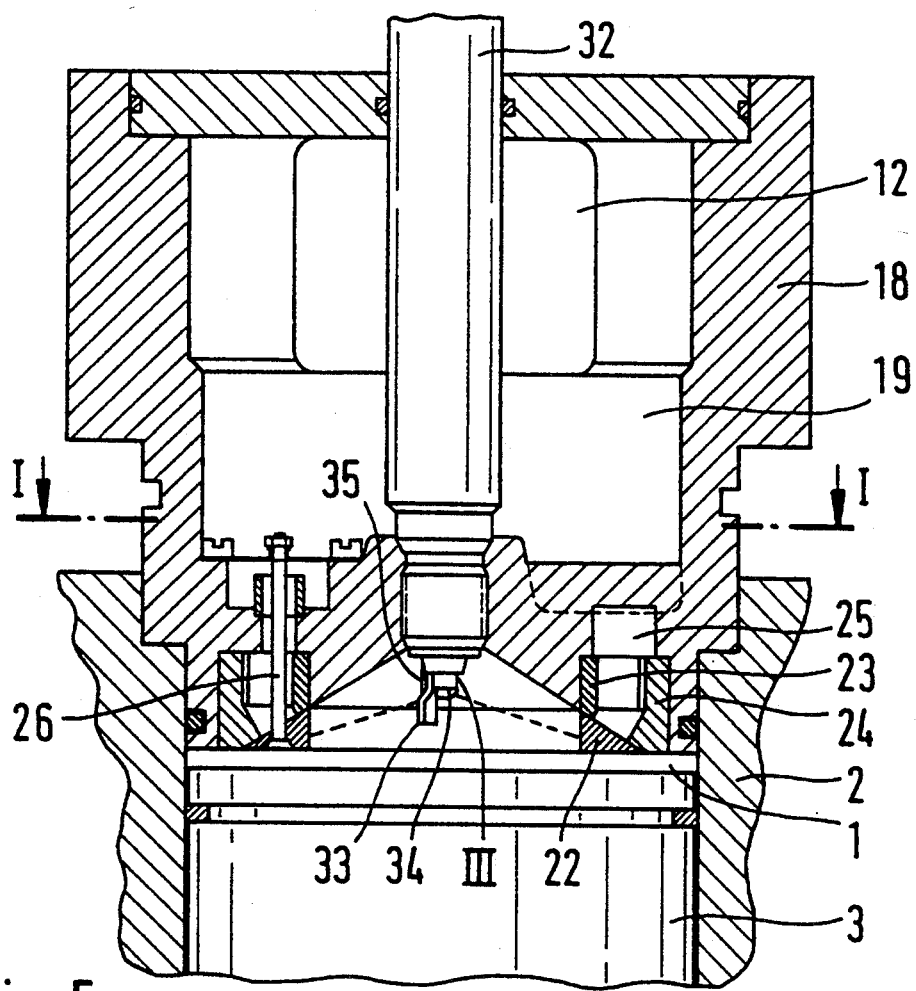
FIG. 5 is a longitudinal section through a cylinder head along the line II—II in FIG. 6.

The two-way scavenging process in accordance with the invention will be described below by means of three exemplary embodiments designed differently with regard to the supply of combustion air. Besides the standard and known reverse scavenging, designated hereinafter as the first scavenging path of the scavenging procedure, a second step of the scavenging process is executed in all three examples in which combustion air is supplied to the combustion chamber via the cylinder head as the second scavenging path, and a control valve controls the air intake. It is characteristic for all intake valves used in the two-way scavenging process in accordance with the invention that they are opened and closed by pressure up- or downstream of the valve, i.e., by the pressure difference, and not by a camshaft with forcible control, as they are typically used. The procedural characteristics of the invention are described in more detail above.

FIG. 1 shows the course of the maximum attainable average pressure over the rpm for two-stroke internal combustion engines; the abscissa discloses the rpm in revolutions per minute of the internal combustion engine, while the ordinate represents the maximum effective average pressure of the engine. The lower, solid line A corresponds to a two-stroke internal combustion engine with normal reverse scavenging. The dashed characteristic curve C shows an optimized engine in accordance with the invention. While in A the loss of fresh charge is high within the lower rpm range because, due to gases streaming back from the exhaust via the discharge slits of the two-stroke engine and infiltrating the combustion air flowing by means of the input slits, and dilute it in a sort of interior exhaust gas return, this disadvantage is greatly reduced by the two-way scavenging process in accordance with the invention and described further below. By means of this, unburnt gas charge values and degrees of effectiveness are attained, both in the middle and lower rpm range, that are good in comparison to those attained at high rpm. Fewer spark failures and fewer hydrocarbons occur, consumption is better and the torque in the lower rpm range is significantly improved. The characteristic curve attained by C is, however, also based on the advantage in accordance with the invention that the loss of unburnt gas is greatly reduced in the exhaust system, which contributes correspondingly to the aforementioned advantages. The characteristic curve B is attained when the head scavenging, superimposed on the reverse scavenging (second scavenging path), is effected via an additional charge.

FIG. 2 is an elementary circuit diagram showing a two-stroke internal combustion engine in which a combustion chamber 1 is defined by an engine cylinder 2, an engine piston 3 and a cylinder head 4. The engine piston 3 cooperates with a crankshaft 5, and the underside of the engine piston 3, together with the crankcase 6, forms a pump that aspirates combustion air via a flap valve 7 from outside the crankcase 6 during the upward stroke of the engine piston 3 and conveys the air to the combustion chamber 1 via a flow conduit 8 during the downward stroke of the engine piston 3, while the flap valve 7 is correspondingly closed. Inlet slits 9 and outlet port 11 are disposed in the lower area of the wall of the engine cylinder 2, and are controlled by the engine piston 3 during its stroke and opened in its lower stroke range, as shown.

In a two-stroke engine, the gases are pushed into the exhaust after ignition in the combustion chamber 1 and corresponding expansion with simultaneous, downward displacement of the engine piston 3, and after opening of the outlet port 11, while fresh combustion air flows into the combustion chamber 1 via the simultaneously opened inlet port 9 and supports the outflow of waste gases. This is referred to hereinafter as the first scavenging path.

The second scavenging path is effected via the cylinder head 4, in that precompressed combustion air flows into the combustion chamber 1 via a flow conduit 12 in the cylinder head 4. This combustion air serves as the second scavenging path, as well as the formation of the ignitable mixture, as described below. The first and second scavenging paths optimize the scavenging process in the way described at the outset. The control of this second quantity of combustion air is effected via a control valve 13 that is loaded in the closing direction by means of relatively even spring forces (as described below) and can essentially be opened by means of the gas pressure difference between the flow conduit 12 and the combustion chamber 1. In this way a large cross-section is already released during a small stroke. Fuel supply and ignition are not illustrated in these three exemplary embodiments shown in FIGS. 2–4. They can be, of course, of the most varied ways: by means of suction pipe injection, direct injection, and internal combustion engines that either have externally provided ignition or are self-ignited.

A throttle valve 14 is additionally disposed in the flow conduit 12 to permit the distribution of the quantities of combustion air for the first and second scavenging paths that are supplied under pressure from the crankcase 6; the valve also only closes the second scavenging path within the high rpm range and limits wear caused there by the inertial forces of the valve.

In the two further exemplary embodiments shown in FIGS. 3 and 4, the same applies with regard to the simplified drawing as for the first exemplary embodiment. Thus the parts of the same design are indicated by the same reference numerals, while changed or additional parts are provided with new numerals.

In the second exemplary embodiment of the two-way scavenging process in accordance with the invention, shown in FIG. 3, the combustion air of both the first and second scavenging paths is compressed by means of a charger 15 and supplied, and basically distributed onto both scavenging paths, as in the first exemplary embodiment shown in FIG. 2. In such charge scavenging, higher and, most importantly, rpm-independent compression values can be attained without problems, so that a high torque is generated within the lower rpm range as well, and no misfirings arise as a consequence of uniform gas processing.

The third exemplary embodiment of the two-way scavenging process in accordance with the invention, shown in FIG. 4, involves a combination during combustion air supply, namely for the first scavenging path, through air compression from the crankcase 6 and, for the second scavenging path, through air compression via a charger 16. By means of a throttle 17 in the suction line to the crankcase 6, an adaptation of the quantities of air conveyed by the crank compressor and the charger can be controlled, particularly with regard to the rpm dependency of the conveyance of the crankcase pump. In this way the second scavenging quantity conveyed by the charger 16 is controlled solely by the control valve 13, while the first scavenging quantity is supplied from the crankcase 6 to the combustion chamber 1 only via the inlet port 9. Otherwise, this third exemplary embodiment also functions like the first exemplary embodiment in FIG. 2, described above. The charger 16 can be switched off by means of a clutch, and can be switched off at the highest rpm.

Figure 6:
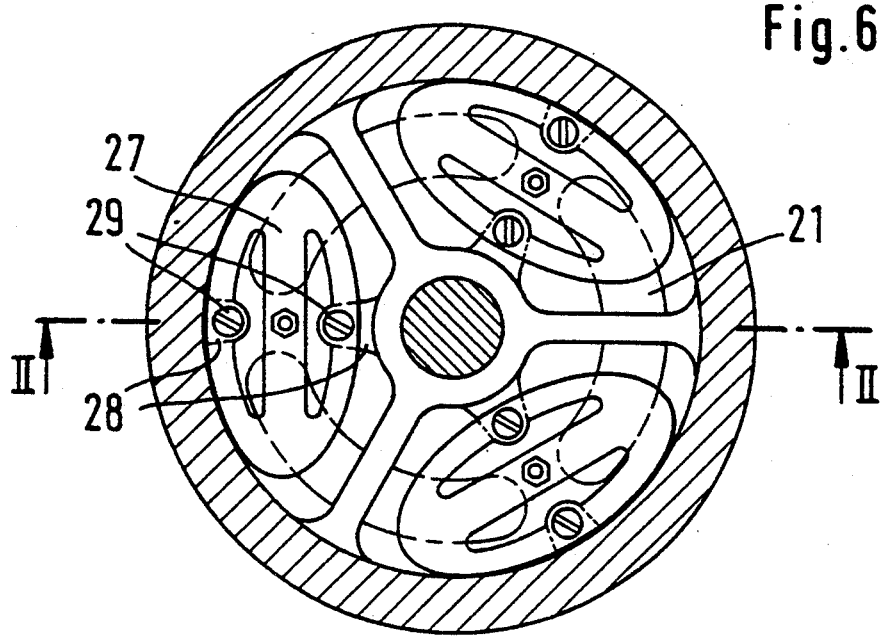
FIG. 6 is a cross-section along the line I—I in FIG. 5.

FIG. 5 shows a longitudinal section through a cylinder head 19 that would be suitable for the three exemplary embodiments shown in FIGS. 2 through 4. This cylinder head 18 is disposed on the engine cylinder 2, which is merely sketched in, and there defines the combustion chamber 1, which is defined on the other side by the engine piston 3. A flow conduit 19 is provided in the cylinder head 18 that communicates with the combustion chamber 1 via kidney-shaped inlet conduits 21, as can be seen from FIG. 6. The flow conduit 19 in turn communicates with the flow conduit 12.

The control valve has as a movable valve element a valve ring 22 with a triangular cross-section that cooperates with two valve seat rings, namely an inner valve seat ring 23 and an outer valve seat ring 24. Valve seat rings 23 and 24 are seated on the combustion chamber side, in an annular groove 25 of the cylinder head 18, and overlap with the kidney-shaped inlet conduits 21. The valve seat ring 22 is coupled via three tension rods 26 to each one of an elliptical leaf spring 27 provided with three spring strips lying next to each other and connected to each other at the ends; the leaf spring is supported at the other end by support eyelets 28 of the cylinder head 18 and secured there by means of screws 29. While the two outer spring pins 41 serve to secure the leaf spring to the cylinder head 36, the tension rod 26 is hinged to the center spring strip 42, as can also be seen in FIG. 8. As can be taken from the drawing, the surfaces of the valve ring 22 exposed to the gas pressure up-and downstream of the intake valve are relatively large, such that correspondingly large opening forces arise at relatively low pressure differences. As soon as the valve ring 22 has lifted from valve seat rings 23 and 24, two annular flow passages are formed between valve ring and seat, so that the flow resistance for the second scavenging quantity of combustion air is relatively low. The low mass of the movable parts and the high possible frequency determined by this are additional factors.

A compact, combined plug/nozzle 32 is disposed vertically and centrally in the cylinder head 18, and in principle can be constructed as described in German Patent Disclosure 37 31 211.

FIG. 5 shows the injection cone of this direct injection, indicated by III, wherein the fuel partly impacts upon the valve ring 22 and is thereby carried along by the flowing combustion air and processed particularly well with this air. Ignition is effected by the one electrode 33, which is connected with the injection nozzle 34 in an electrically conductive manner, while the second electrode 35, in the form of a ground electrode, is connected in an electrically conductive manner to the mantle of the plug/nozzle 32, and thus to the cylinder head 18. The point of ignition is hence in an area in which, in relation to the time of ignition with a predetermined rotating position of the crankshaft or position of the engine piston 3, an ignitable fuel-air mixture is assured, even with small injection quantities.

FIG. 7 also shows a cylinder head 36 that basically corresponds to the one in FIG. 5, but with the difference that here the fuel is injected via low-pressure injection valves 37 into the flow conduit 19 of the cylinder head, upstream of the inlet conduits 21. By means of this, the fuel-air mixture is conveyed via the inlet conduits 21 into the combustion chamber 1 and ignited there by means of a spark plug 40 in a conventional manner. The injection valve 37 can be disposed in various positions inside the cylinder head 36; a second installation position of the injection valve 37 is therefore shown in dashed lines. By means of this embodiment, the valve ring 22 can vertically oscillate freely and unguided with the tension rod 26 in the leaf springs, eliminating frictional forces and the need for lubricants.

As can be taken from FIGS. 7, 9 and 10, the stroke of these leaf springs 38 or the valve ring 22 is limited by stroke catchers: in the closing direction by a stroke catcher 44, and in the opening direction by a stroke catcher 45. FIG. 9 shows the driving pin 26 with leaf spring 38 or the center spring strip 42 in the closed position of the valve, in which the spring strip 42 rests against the stroke catcher 44. Both stroke catchers 44 and 45 are fixed in place on the cylinder head 36, so that when the leaf of the spring impacts upon the stroke catcher, the closing motion of the valve is not only damped, but also limited. In FIG. 10, in contrast, the tension rod 26 and the leaf spring strip 42 assume a position for the opening position of the butterfly valve in which the leaf spring strip 42 likewise rests form-fittingly against the stroke catcher. This stroke catcher 45, however, is profiled (slightly S-shaped) so that, during the opening stroke, the point of impact of the leaf spring strip 42 travels from the outside inwardly, by means of which the actual length of the spring decreases with the consequence that the spring force diminishes correspondingly with a damping effect.

Of course, it is also conceivable that the closing stroke catcher 44 can have an analogous design.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A gas-exchanging process for two-stroke internal combustion engines, including a combustion chamber (1) which receives precompressed combustion air and a quantity of fuel, an engine cylinder (2), an engine piston (3), a crank case (6) and a cylinder head (4);

with reverse scavenging in a combustion chamber, in which the engine piston controls inlet and outlet ports provided in the engine cylinder, near bottom dead center (BDC), and in which the combustion air is blown in while precompressed;

supplying and controlling a quantity of fuel directed into the combustion chamber corresponding to the engine load, in an area of a point of ignition; and directing a second supply of precompressed combustion air into the combustion chamber controlled via an intake valve, likewise in the area of the point of ignition;

along with reverse scavenging as a first scavenging path, this second supply of air serves as a second scavenging path of the gases in the combustion chamber, and additionally produces an ignitable fuel-air mixture in the area of the point of ignition of the combustion chamber;

and controlling the quantity of air of the second supply of air by means of a differential pressure up- and downstream of the intake valve; and actuating the intake valve by means of said differential pressure.

2. The process as defined by claim 1, in which the precompression of the combustion air of both scavenging paths is effected in the crankcase.

3. The process as defined by claim 1, in which the precompression of the combustion air of both scavenging paths is effected by a charger.

4. The process as defined by claim 1, in which the combustion air for the first scavenging path is compressed in the crankcase and in a separate charger for the second scavenging path.

5. The internal combustion engine as defined by claim 1, in which the engine further comprises a spark plug

(40) in the cylinder head in an area of the point of ignition.

6. The internal combustion engine as defined by claim 5, in which the fuel is injected into the flow conduit (19) in the cylinder head (36) via a low-pressure injection valve (37), upstream of the intake valve.

7. The internal combustion engine as defined by claim 5, in which the fuel is injected directly into the combustion chamber (1) via a high-pressure injection valve (34).

8. The internal combustion engine as defined by claim 7, in which the injection nozzle (34) and the ignition device are embodied as a compact unit (plug/nozzle) with an injection valve (34) having at least one injection opening and electrically insulated against a support tube with which it is installed in the cylinder head (18), and having two ignition electrodes (33, 35) near the injection opening of the injection nozzle (34), wherein one electrode (33) is disposed on the body of the injection valve (34) and electrically connected by means of the body, and the other electrode (35) is grounded to the engine via the support tube.

9. A two-stroke internal combustion engine which comprises:
at least one combustion chamber (1) defined by an engine cylinder (2), an engine piston (3) and a cylinder head (4);
a fuel supply and fuel quantity control device (32, 37);
at least one air compressor (6, 15, 16) for the combustion air;
inlet and outlet ports (9, 11) in a wall of the engine cylinder (2) in an area of bottom dead center (BDC) of the engine piston (3), said inlet and outlet ports are controlled by the engine piston (3) for the first scavenging path serving as reverse scavenging and at least one additional inlet conduit of the combustion air in the cylinder head (4) that is controlled by an intake valve (22-24) loaded by the combustion chamber pressure in a closing direction;
an intake valve of the second scavenging quantity is embodied as a control valve (22-29) including a movable valve element (22) which is loaded by at least one closing spring (27) counter to an opening direction and has a surface active in an opening direction, upstream of a valve seat (23, 24), so that the opening the intake valve is effected by a difference of the surfaces of the intake valve acting in the opening or closing direction, taking into consideration the closing spring force.

10. The internal combustion engine as defined by claim 9, in which the movable valve element is embodied as a ring (22) that controls a number of correspondingly annularly disposed inlet conduits (21) for the second scavenging quantity and is coupled via a plurality of tension rods (26) to at least one closing spring (27, 38).

11. The internal combustion engine as defined by claim 9, in which t he intake valve is embodied as a double-seat control valve.

12. The internal combustion engine as defined by claim 10, in which the valve ring (22) tapers toward the cylinder head (4) and cooperates with a double seat surface correspondingly embodied conically on the inside and disposed on the cylinder head (4), and into which the inlet conduits (21) discharge.

13. The internal combustion engine as defined by claim 10, in which the valve ring (22) has a triangular cross-section.

14. The internal combustion engine as defined by claim 10, in which the valve seat is disposed on a valve ring seat cut into an annular groove (25) of the cylinder head (4).

15. The internal combustion engine as defined by claim 14, in which the valve ring seat comprises two valve seat rings (23, 24) disposed concentrically to one another, an inner seat ring (23) and an outer seat ring (24), between which an annular chamber for the flow of gas is formed.

16. The internal combustion engine as defined by claim 14, in which kidney-shaped openings (21) are provided as inlet conduits at a bottom of the annular groove (25).

17. The internal combustion engine as defined by claim 10, in which the tensioning rods (26) are guided in bores of the cylinder head (18), near the inlet conduits (21), and that the closing spring (27) is disposed on the cylinder head (18), upstream of the inlet conduits (21).

18. The internal combustion engine as defined by claim 17, in which a leaf spring means (27, 38) secured to the cylinder head (18, 36), on the side remote from the valve seat, serves as the closing spring.

19. The internal combustion engine as defined by claim 18, in which the leaf spring means comprises at least three individual leaf springs (38).

20. The internal combustion engine as defined by claim 19, in which the individual leaf springs (38) comprise oval disks with longitudinally oriented elongated recesses forming an interposed spring strip (39), and the tension rods (26) are attached to a center spring strip (42), while the outer spring strips (41) are secured to the cylinder head (36).

21. The internal combustion engine as defined by claim 18, in which the stroke of the leaf spring means is limited by stroke catchers (44, 45).

22. The internal combustion engine as defined by claim 21, in which the stroke catcher (45) changes the actual length of the center spring strip (42) as a function of the stroke by various stroke-dependent impacts of the leaf spring surface on that of the stroke catcher.

23. The internal combustion engine as defined by claim 21, in which two stroke catchers are provided: one for limiting the opening stroke, and a second one for limiting the closing stroke; the stroke catcher (44) limiting the closing stroke is planar, while the stroke catcher that determines the opening stroke has at least one platelike arch.

24. The internal combustion engine as defined by claim 9, in which a cross-sectional adjustable throttle valve (14) is disposed in the flow conduit (12) of the second scavenging quantity.

25. The internal combustion engine as defined by claim 24, in which the intake valve (22-29) is blocked against opening.

* * * * *